US009413816B2

(12) United States Patent
Kountouris et al.

(10) Patent No.: US 9,413,816 B2
(45) Date of Patent: Aug. 9, 2016

(54) PROTECTION AGAINST THE DETECTION OF ALERT SIGNALS

(75) Inventors: Apostolos Kountouris, Grenoble (FR); Benoît Miscopein, Grenoble (FR)

(73) Assignee: Orange, Paris (FR)

( * ) Notice: Subject to any disclaimer, the term of this patent is extended or adjusted under 35 U.S.C. 154(b) by 406 days.

(21) Appl. No.: 13/996,772

(22) PCT Filed: Dec. 16, 2011

(86) PCT No.: PCT/FR2011/053027
§ 371 (c)(1),
(2), (4) Date: Jun. 21, 2013

(87) PCT Pub. No.: WO2012/085413
PCT Pub. Date: Jun. 28, 2012

(65) Prior Publication Data
US 2014/0074929 A1    Mar. 13, 2014

(30) Foreign Application Priority Data
Dec. 21, 2010 (FR) ..................... 10 60961

(51) Int. Cl.
*G06F 15/16* (2006.01)
*H04L 29/08* (2006.01)
(Continued)

(52) U.S. Cl.
CPC ............. *H04L 67/10* (2013.01); *G08B 25/007* (2013.01); *H04B 1/7163* (2013.01); *G08B 25/10* (2013.01); *H04B 2001/6908* (2013.01); *H04L 27/0006* (2013.01); *H04L 67/12* (2013.01)

(58) Field of Classification Search
CPC ............ H04L 67/12; H04L 27/0006

USPC ......................................... 709/204
See application file for complete search history.

(56) References Cited

U.S. PATENT DOCUMENTS

2010/0182950 A1* 7/2010 Sexton et al. ............ 370/328
2011/0160998 A1* 6/2011 Rissanen .................. 701/201

FOREIGN PATENT DOCUMENTS

CN      1994015 A     7/2007
CN    101351713 A     1/2009
(Continued)

OTHER PUBLICATIONS

Kwon et al., "The security monitoring system using IEEE 802.15.4 protocol and CMOS Image Sensor," 2009 International Conference on New Trends in Information and Service Science, NISS'09, IEEE, Piscataway, NJ, USA, pp. 1197-1202 (Jun. 30, 2009).
(Continued)

*Primary Examiner* — Adnan Mirza
(74) *Attorney, Agent, or Firm* — Drinker Biddle & Reath LLP

(57) ABSTRACT

A method of communicating between at least one event detector sensor and a collector of event detection data transmitted by the sensor in the form of an event signalling message whose modulation is defined by at least one spreading code. The method comprises the steps implemented by the sensor of, upon detection of an event, generation of data of event detection, of reception of a synchronization message emitted by the collector, the synchronization message comprising a seed for a pseudo-random generation of at least one spreading code and of pseudo-random generation of at least one spreading code on the basis of the seed. The method furthermore comprises a step of emitting an event signalling message whose modulation is defined by the at least one spreading code generated randomly, the event signalling message comprising the event detection data.

13 Claims, 6 Drawing Sheets

(51) Int. Cl.
*G08B 25/00* (2006.01)
*H04B 1/7163* (2011.01)
*H04L 27/00* (2006.01)
*G08B 25/10* (2006.01)
*H04B 1/69* (2011.01)

(56) References Cited

FOREIGN PATENT DOCUMENTS

| CN | 101461151 A | 6/2009 |
|---|---|---|
| CN | 101507146 A | 8/2009 |
| WO | WO 2006/022802 A1 | 3/2006 |

OTHER PUBLICATIONS

Park et al., "Smart Digital Door Lock for the Home Automation," TENCON 2009, 2009 IEEE Region 10 Conference, IEEE, Piscataway, NJ, USA, pp. 1-6 (Jan. 23, 2009).

English Translation of Office Action issued for CN 201180067871.X (Dec. 31, 2014).

* cited by examiner

PROTECTION AGAINST THE DETECTION OF ALERT SIGNALS

CROSS-REFERENCE TO RELATED APPLICATIONS

This application is the U.S. national phase of the International Patent Application No. PCT/FR2011/053027 filed Dec. 16, 2011, which claims the benefit of French Application No. 1060961 filed Dec. 21, 2010, the entire content of which is incorporated herein by reference.

FIELD

The present invention relates to protection of the transmission of alert messages between sensors and a collector forming a network.

BACKGROUND

It relates more precisely to event detection applications for a M2M communication (for "Machine to Machine") in a M2M network comprising sensors and at least one collector resulting from the occurrence of an event detected by a sensor in the network. In a M2M network, an event is associated with the observation of data of one or more types. When a condition relating to at least one item of such observed data is satisfied, an event is generated and signalling of this event is transmitted to the collector. The detection of the event can be related to an alert within a security application. The event can occur consecutive to the passing of a sensor measurement below or above a threshold value, for example. The moment when the signalling of the event is sent can be defined by means of a timer and a predefined value. Thus, when the timer reaches the predefined value, sending the signalling is triggered.

The signalling of an event can therefore be periodic, as in the case of a periodicity for taking measurements from a sensor, or asynchronous when it is transmitted consecutive to the occurrence of a detected event, like the passage of a sensor measurement below or above a threshold value, as mentioned above.

Such communications between sensors and a collector generally have constraints with regard to security of operation and security of information carried. In fact, because of the nature of the communication, in the form of radiofrequencies, any message transmitted by one of the entities, sensor or collector, can be intercepted by a malicious third party.

At present, cryptographic methods make it possible to make information contained in messages exchanged secure. They propose for example the use of encryption/decryption devices based on at least one secret key.

However, in the case of presence detection systems inside premises for example, the simple fact of sending a message consecutive to the detection of an event, already constitutes information.

For example, a presence detection system installed in the home of a user can comprise a set of sensors distributed through a set of rooms in the home, the sensors being suitable for communicating with a collector. Thus, when one of the sensors detects a presence in a room, it can transmit an encrypted message to the collector. A malicious third party located outside the home can, by means of a radio listening device, detect the transmission of the message and deduce the occurrence of a detection by a sensor inside the house. This knowledge can then be used by the third party to commit malicious acts. In fact, upon the detection of a presence and interception of the signalling, the malicious third party can decide to commit a malicious act or not. Consequently, the security and confidentiality of the system risks being compromised.

The detection system therefore does not make the communications between these elements transparent to a malicious third party.

A solution for making the detection of an event by a network of sensors transparent would consist of making the communications strictly periodic and, in each period, sending an encrypted message containing either information relating to the detection of an event or information relating to no detection.

However, in order to obtain a level of responsiveness close to that of asynchronous detection systems at a pace set by the occurrence of events, systems detecting events by sending periodic messages must have short periods, which generates a high energy consumption. Also, these systems are easily intercepted and jammed. Finally, the management of the periodic sending of messages in parallel to the individual detection of an event is complex.

Another solution consists of using a transmission of ultra wide band messages (UWB), which consists of a low-energy emission in a wide spectrum of frequencies. Thus, the message sent is concealed beneath a noise threshold but can be picked up by a receiver when the latter is synchronized with a transmitter of such messages. A UWB transmission mode, called TH-UWB (for "Time-Hopping Ultra Wide Band") consists of transmitting ultra wide band signals, of GigaHertz (GHz) order, of very short duration, of the order of a nanosecond, in an irregular manner, the moments of transmission being determined by a spreading code, such as a time skip code for example. The transmissions of pulses are therefore spaced apart with respect to one another, the spacings being provided by the time skip code. Since this skip code is shared by the transmitter and the receiver, the receiver can open demodulation windows at the moments of arrival of the pulses. In a variant, it is possible to detect the pulses, measure the time differences between the pulses received and compare these differences with the skip code to find the sequence transmitted.

However, techniques such as that known as a "dirty template" make it possible for a third party to find a recurrent time signature in a signal transmitted and thus to find a form of synchronization, without having any knowledge of the skip code used. The security inherent in detection systems using the transmission of radio frequencies therefore does not make it possible to prevent the interception of information by a third party.

SUMMARY

The present invention will improve the situation.

For this purpose, it proposes a method of communicating between at least one event detector sensor and a collector of event detection data transmitted by the sensor in the form of an event signalling message the modulation of which is defined by at least one spreading code, the method comprising the steps implemented by the sensor:

upon detection of an event, generation of event detection data;

reception of a synchronization message transmitted by the collector, the synchronization message comprising a seed for a pseudo-random generation of at least one spreading code;

pseudo-random generation of at least one spreading code on the basis of the seed;

transmission of an event signalling message the modulation of which is defined by the at least one spreading code generated randomly, the event signalling message comprising the event detection data;

The invention makes it possible advantageously to share a transmission mode defined by a spreading code, without first communicating the spreading code used. In fact, the collector communicates only a seed to the sensor independently of the detection of the event. This transmission can be performed, by way of example, periodically or consecutive to any decision of the collector. The event detection message is transmitted by the sensor with a modulation defined by the spreading code. Since the generation of the spreading code is pseudo-random, the collector can, for its part, generate the same spreading code on the basis of the seed and thus configure a message reception interface the modulation of which is defined by the spreading code. The pseudo-random generation of the spreading code is therefore confidential between the sensor and the collector and is consequently not known to a third party. Thus, a malicious third party can possibly intercept the seed transmitted in the synchronization message, but, because the method for generating the spreading code according to the invention is only known to the sensor and the collector, the third party cannot, on the basis of this seed, generate the spreading code shared by the collector and the transmitter, which makes the interception of the event signalling message impossible for this third party. According to the invention, a spreading code can advantageously be generated every n symbols, integer n being greater than or equal to one, of a signalling message on the basis of the same seed or a different seed.

In any case, the same spreading code is not used for more than one event signalling message. Thus, attempted interception by "dirty template" will not be successful. In fact, this interception technique uses information acquired on the basis of messages previously sent according to the same spreading code.

Within the framework of the invention, the detection of the event and the reception of the synchronization message are decorrelated. The sensor can thus be, by default, in a deactivated reception mode and change to an active reception mode upon the detection of an event. It therefore saves energy. In fact, the deactivation of the reception mode makes it possible to put on standby several functionalities of the sensor, which therefore consumes less energy. The use of energy is therefore optimized for the sensor.

In an embodiment of the invention, the synchronization message is transmitted cyclically, the seed it comprises being specific to the transmission cycle of the synchronization message, the sensor detects the event during a given cycle and processes the synchronization message of the cycle which follows said given cycle.

This embodiment advantageously allows the sensor to receive, in a time period dependent on the duration of the cycle, a synchronization message the seed of which is renewed in each cycle. Thus, the spreading code generated on the basis of the seed is modified cyclically, which improves the security associated with exchanges between the collector and the sensor. Also, the duration of a cycle can be reduced so that the sensor can rapidly transmit an event signalling message after the detection of an event. In fact, no energy constraint is associated with the collector, which can be connected to the mains for power supply. The periodicity is thus only imposed on the collector and not on the sensors which react to an individual event detection.

Thus, at each event detection, the invention makes it possible to obtain a new seed for the generation of a spreading code defining the modulation of an event signalling message. Consequently, the "dirty template" technique cannot find a recurrent signature and the security associated with sending an event detection message is therefore increased.

In a variant, it can also be provided that the seed is specific to a set of several cycles. In the event that the detection of an individual event is relatively rare and the synchronization messages are sent regularly, this embodiment makes it possible to avoid too frequent renewal of the seed transmitted and therefore to prevent random generations of seeds by the collector, which will be potentially useless in view of the rarity of the event detections.

According to another aspect of the invention, only a part of the seed is specific to each cycle, the other part of the seed being predefined between the sensor and the collector.

Thus, even in the event that a malicious third party has managed to discover the way in which the spreading code is generated pseudo-randomly, the party could not gain access to the other part of the seed, which is shared only by the sensor and the collector and which is confidential. Thus, the spreading code generated on the basis of the complete seed will be known only by the sensor and the collector, which improves the security associated with exchanges between the sensor and the collector, even in the event that the malicious third party knows an algorithm for the pseudo-random generation of spreading codes.

In an embodiment of the invention, the spreading code is a skip code and the signalling message is transmitted in the form of an ultra wide band signal by time skip defined by the skip code.

The use of a time skip code for the transmission of ultra wide band signals consists of the transmission of ultra wide band signals, of GigaHertz (GHz) order, of very short duration, of the order of a nanosecond, in an irregular manner, the moments of transmission being determined by the skip code. The transmissions of pulses are therefore spaced apart with respect to one another, the spacings being provided by the time skip code. Since this skip code is shared by the collector and the sensor, the entity receiving a message can open demodulation windows at the moments of arrival of the pulses. Also, the transmission of such low-energy signals distributed over a very wide frequency band entails low energy consumption and the signals can be concealed beneath a noise threshold. The use of ultra wide band signals advantageously provides for a considerable energy saving for the sensor and makes it possible to conceal the event signalling message beneath a noise threshold, thus improving the security associated with exchanges between the sensor and the collector.

According to an embodiment of the invention, as a period corresponding to a synchronization message transmission cycle by the collector is divided into a plurality of time slots, the message from the collector is received by the sensor during the first time slot of each cycle and the signalling message is transmitted during a subsequent time slot.

This embodiment makes it possible to define time slots during which the different messages are exchanged between the collector and the sensor. Thus, it is conceivable to reserve slots for communications from the collector to the sensor and other slots for communications from the sensor to the collector. The collector and the sensor can thus configure their radio interfaces for the reception or transmission of messages depending on the time slot in which they are located. Moreover, several sensors can thus communicate an event detection message during a single cycle but during different slots, which makes it possible to avoid a collision between the event detection messages during their reception by the collector.

In an embodiment of the invention, a plurality of spreading codes is generated, the plurality being divided into sequences of spreading codes, each sequence of spreading codes being associated with a time slot starting from the second time slot and each message transmitted in a time slot is transmitted with a modulation defined by the sequence of spreading codes associated with the time slot.

This embodiment makes it possible advantageously to use a plurality of skip codes for a single cycle, which improves the security associated with the exchanges between the sensor and the collector. Thus, considering that an event signalling message is made up of several symbols to be transmitted, each symbol can be transmitted with a different modulation defined by one of the spreading codes in the sequence of spreading codes.

In an embodiment of the invention, the event signalling message comprises a synchronization preamble for synchronising the sensor and the collector, said synchronization preamble being transmitted with a modulation defined by a single spreading code.

This embodiment makes it possible advantageously to accelerate synchronization between the collector and the sensor and thus to facilitate the reception of the other part of the message, comprising in particular the event detection data. The spreading code used can be fixed and predetermined between the sensor and the collector, in order rapidly to synchronize the collector and the sensor. The spreading code used for the modulation of the synchronization preamble can also be generated on the basis of the seed of the synchronization message, which makes easy and rapid time synchronization of the collector and the sensor possible, since a single spreading code is used for the synchronization preamble, along with an improvement in the security of the exchange by modifying the spreading code used upon reception of a seed in a synchronization message.

The invention also relates to a computer program comprising instructions for implementing the communication method which has just been described, when this program is executed by a processor.

The invention also relates to a method of communicating between at least one event detector sensor and a collector of event detection data transmitted by the sensor in the form of an event signalling message the modulation of which is defined by at least one spreading code, the method comprising the steps implemented by the collector:
  transmission of a synchronization message, said synchronization message comprising a seed for a pseudo-random generation of at least one spreading code;
  pseudo-random generation of at least one spreading code on the basis of the seed; and
  reception of an event signalling message the modulation of which is defined by the at least one spreading code, the event signalling message comprising event detection data.

The communication method the steps of which are implemented by the collector will of course be able to comprise all or part of the different characteristics relating to the communication method according to the invention, the steps of which are implemented by the sensor. Thus, these characteristics and their associated advantages are the same as those of the preceding communication method and are not further detailed.

The invention also relates to a computer program containing instructions for implementing the communication method which has just been described, when this program is executed by a processor.

The invention also relates to a communication system comprising at least one event detector sensor and a collector of event detection data transmitted by the sensor in the form of an event signalling message the modulation of which is defined by at least one spreading code, the collector comprising means for:
  transmitting a synchronization message comprising a seed;
  receiving a signalling message comprising detection data from said sensor;
  and the sensor comprising means for:
  detecting an event;
  generating event detection data;
  receiving a synchronization message from the collector, said synchronization message comprising a seed for pseudo-random generation of at least one spreading code;
  pseudo-randomly generating at least one spreading code on the basis of the seed; and
  transmitting an event signalling message the modulation of which is defined by the at least one spreading code, the signalling message comprising the event detection data.

In an embodiment, the system also comprises a scrambler suitable for transmitting signals the modulation of which is defined by a random spreading code. The use of a scrambler makes it possible to provide information not corresponding to the detection of an event to a malicious third party and thus to complicate access to exchanges between the sensor and the collector.

The invention also relates to a collector of event detection data comprising means for:
  transmitting a synchronization message, the synchronization message comprising a seed for pseudo-random generation of at least one spreading code;
  pseudo-randomly generating at least one spreading code on the basis of the seed; and
  receiving an event signalling message the modulation of which is defined by said at least one spreading code, the signalling message comprising event detection data.

The invention also relates to an event detector sensor comprising means for:
  detecting an event;
  generating event detection data;
  receiving a synchronization message, the synchronization message comprising a seed for pseudo-random generation of at least one spreading code;
  pseudo-randomly generating at least one spreading code on the basis of the seed; and
  transmitting an event signalling message the modulation of which is defined by said at least one spreading code, the signalling message comprising the event detection data.

BRIEF DESCRIPTION OF THE DRAWINGS

Other characteristics and advantages of the invention will become apparent upon examination of the detailed description given below and the attached drawings, in which:

FIG. 3.b illustrates a structure of an event signalling message according to the invention;

FIG. 3.c illustrates a structure of a acknowledgement message according to the invention;

DETAILED DESCRIPTION

Figure 1:
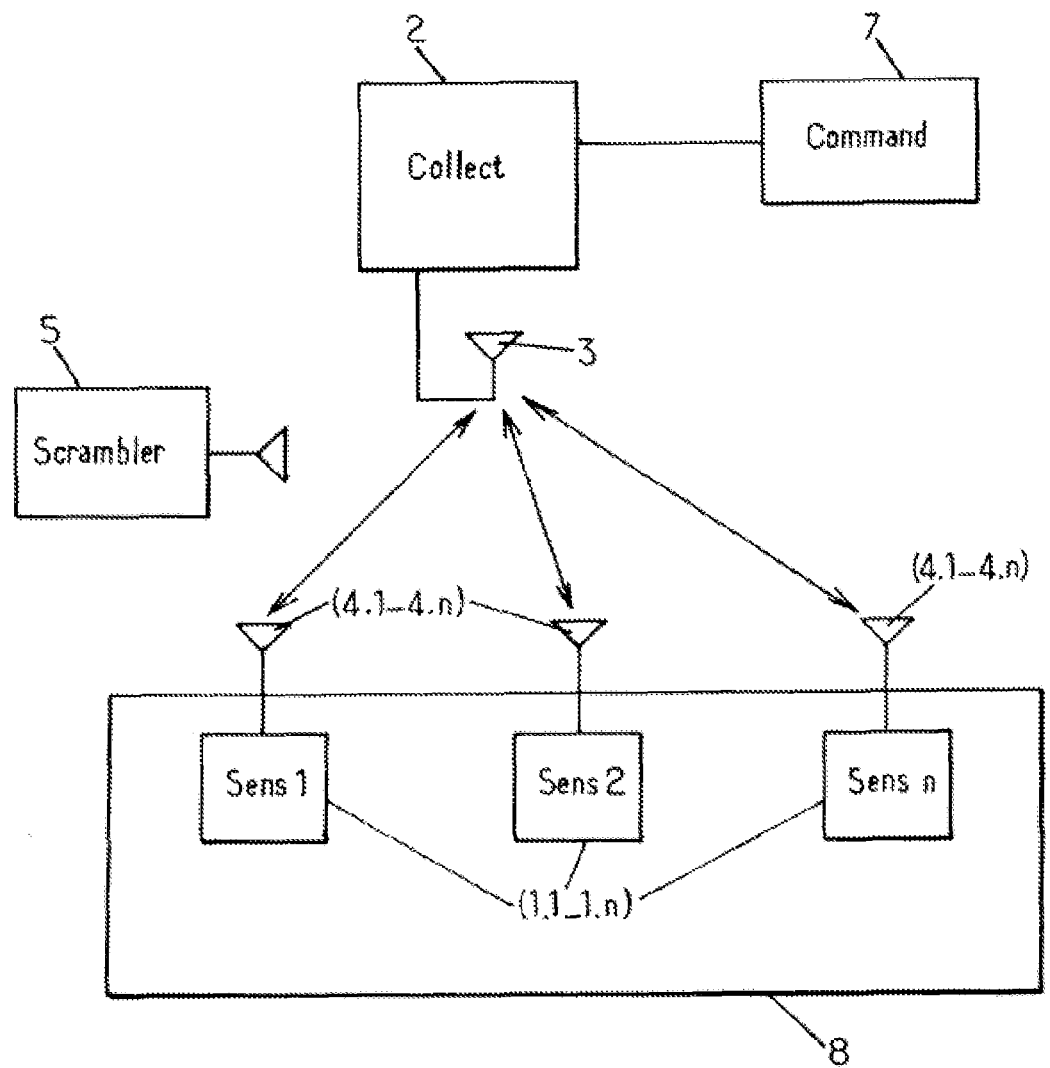
FIG. 1 illustrates a general architecture of a detection system according to an embodiment of the invention.

FIG. 1 illustrates a general architecture of a detection system according to an embodiment of the invention.

This embodiment considers a bidirectional communication mode of the pulsed ultra wide band type. In this embodiment, the spreading code is a time skip code and the modulation of a message consists of a time configuration of symbols of the message defined by the skip code or by a sequence of skip codes.

However, the invention is not limited to this communication mode. It could in particular be applied to any communication mode using a spreading code for the modulation of the symbols contained in a message to be transmitted confidentially between a transmitter and a receiver. Reference may be made for example to the article by Pickholtz, R. L., Schilling, D. L., and Milstein, L. B. entitled "Theory of Spread-Spectrum Communications—A Tutorial" published in IEEE Trans. Commun., vol. COM30, no. 5, in May 1982, pp 855-884. The cited reference cited gives examples of systems using a frequency modulation defined by a spreading code.

The system comprises a collector 2 and a network of n sensors 1.1-1.n. A bidirectional communication mode of the pulsed ultra wide band type with time skip code can be implemented by means of wireless interfaces 4.1-4.n of the sensors 1.1-1.n and a wireless interface 3 of the collector 2. The wireless interfaces 4.1-4.n and 3 are subsequently considered as radio interfaces. The sensors 1.1-1.n are also suitable for detecting events occurring in a surveillance zone 8. No limitation is attached to the type of sensors used here. They can be, by way of example, presence sensors, accelerometers, gyroscopes, etc.

Upon detection of an event in the surveillance zone 8, the sensors 1.1-1.n are suitable for transmitting in the direction of the collector 2 an event signalling message in ultra wide band with time skip code. The communication protocol between the collector 2 and the sensors 1.1-1.n will be better understood by looking at FIG. 2 detailed below.

The system can also comprise a processing device 7 connected to the collector 2 which makes it possible to process the event signalling messages initially transmitted by the sensors 1.1-1.n.

The detection system can also comprise a scrambler 5 suitable for transmitting signals in ultra wide band according to a random time skip code, which makes it possible to send non-relevant signals to a third party wishing to intercept the communications between the collector 2 and the network of sensors 1.1-1.n and thus to complicate acquisition of the skip code(s) allowing communications in the system. In an embodiment of the invention, the scrambling functions of the scrambler 5 are integrated into the collector 2.

Figure 2:
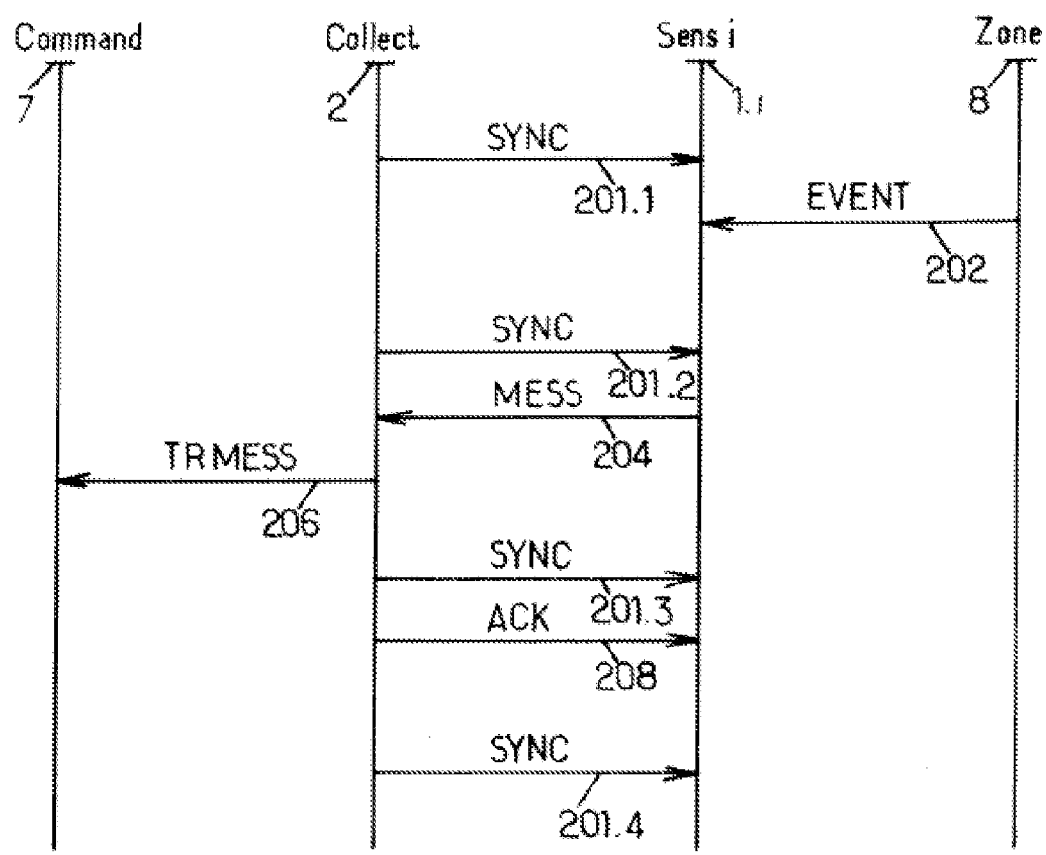
FIG. 2 illustrates an example of implementation of a method for communicating between an event detector sensor and a collector according to an embodiment of the invention.

FIG. 2 illustrates an example of implementation of a method for communicating between a sensor 1.i suitable for detecting events in the surveillance zone 8 and the collector 2 connected to the processing device 7. This communication method can be generalized to other sensors 1.1-1.n in the system described above.

In an embodiment, the collector 2 is suitable for periodically transmitting a synchronization message 201.1-201.4 in the direction of the sensor 1.i. The period corresponding to a cycle can be divided into a plurality of time slots, the first of them being, in an embodiment of the invention, dedicated to the transmission of synchronization messages by the collector 2. In an embodiment with several sensors as shown in FIG. 1, the collector 2 sends the synchronization messages 201.1-201.4 to all of the sensors in the network. The synchronization message is preferentially transmitted with a fixed skip code, so as to avoid the prior transmission of a supplementary message for synchronization of the collector 2 and the sensor 1.i. The sensor 1.i knows the fixed skip code and is capable of receiving the synchronization message.

Figure 3A:
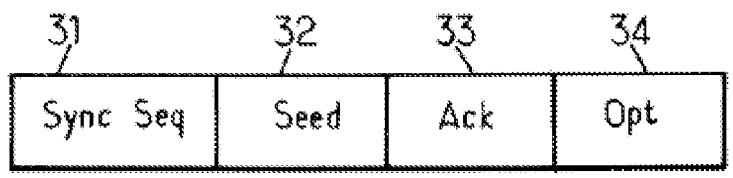
FIG. 3.a illustrates a structure of a synchronization message according to the invention.
Figure 3B:
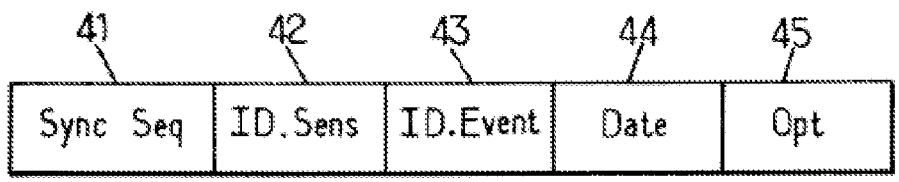
Figure 3C:
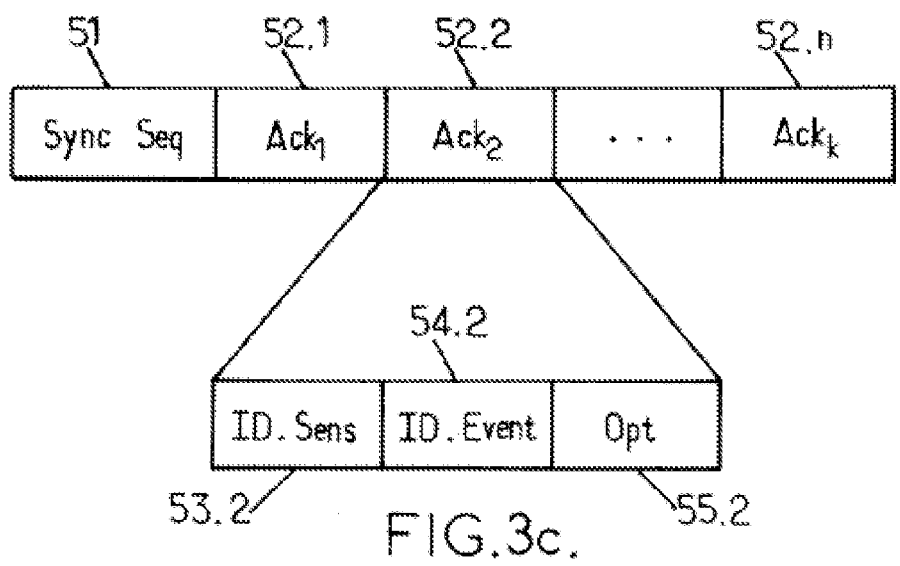

A synchronization message can be structured as shown in FIG. 3.a. The synchronization message can comprise a synchronization sequence 31, a seed 32, an acknowledgement option 33 and optional data 34. The synchronization sequence 31 is made up of a set of symbols known to the collector 2 and the sensor 1.i so that they can synchronize themselves and thus successfully receive the rest of the synchronization message. The seed 32 can be generated randomly by the collector 2 and is used by the collector 2 and by the sensor 1.i pseudo-randomly to generate a skip code or a sequence of skip codes which could be used to send event signalling messages during the period associated with the synchronization message transmission cycle. The pseudo-random mode of generation of the seed or the sequence of seeds makes it possible to obtain the same seed or the same sequence in the collector 2 and the sensors 1.1-1.n on the basis of a single seed for a period corresponding to a given cycle, which improves the security of such a communication method.

The acknowledgement option 33 defines the mode of transmission of an acknowledgement message during the period following the transmission of the synchronization message. It is thus possible to provide for sending an acknowledgement message during a time slot consecutive to the sending of synchronization messages, thus in the first slot. In an embodiment, the acknowledgement messages can be transmitted during the second time slot of the period corresponding to a synchronization message transmission cycle. It is also conceivable to provide for the use of a plurality of time slots for sending acknowledgement messages, for example in the event that the collector 2 has a consistent number of acknowledgement messages to send.

The optional data 34 can, by way of example, constitute a space reserved for the attachment of supplementary information associated with detection and can be contextual data. The optional data 34 can also define a parameter making it possible to fix the number of consecutive symbols in a message which are to be arranged temporally according to the same spreading code.

The sensor 1.i can initially be in a deactivated reception mode or standby mode, enabling it to reduce its energy consumption when it is not active. In this mode, the sensor does not receive synchronization messages from the collector 2. The sensor 1.i can nonetheless detect an event in the surveillance zone 8. In the embodiment presented here, the sensor 1.i detects an event 202. The sensor 1.i then changes from standby mode to an active reception mode in which it is suitable for receiving a synchronization message. In fact, as described above, the synchronization message is transmitted according to a fixed skip code, which is known to the sensor 1.i, which can thus configure its reception so as to receive a synchronization message defined by such a skip code. In an embodiment of the invention, the sensor 1.i is in permanent active reception mode and thus receives the synchronization message from the collector 2 in each cycle. The sensor 1.i can thus generate and transmit an event signalling message in the cycle during which the event was detected according to a skip code generated upon reception of the synchronization message of the corresponding cycle.

The synchronization message 201.2 is transmitted by the collector 2 in the direction of the sensor 1.i, which receives it.

The sensor 1.i is suitable for extracting the seed 32 contained in the synchronization message and for generating an event signalling message 204 the structure of which is shown, for illustration, in FIG. 3.b. The synchronization message can be shown in the form of a set of symbols. By way of example, in the case of a digital message, a symbol can represent a bit. The event signalling message can comprise a synchronization sequence 41, sensor identification data 42, event detection data 43, a date 44 and optional data 45.

The synchronization sequences 41, also called synchronization preamble 41, used for the event signalling messages can be fixed and thus make it possible to mark the start of a message for the collector 2. The synchronization preamble 41 can also be generated pseudo-randomly by the sensor on the basis of the seed received in the synchronization message.

The sensor identification data 42 allow the collector 2 to identify the sensor transmitting the event signalling message 204.

The event detection data 43 make it possible to inform the collector 2 that a particular event has been detected. These data can relate to a sensor measurement, for example.

The date 44 makes it possible to attach time information to the event detected. The date 44 can be calculated by the sensor 1.i on the basis of an internal clock, for example. The optional data 45 constitute a space reserved for the addition of supplementary information associated with the detection and can be contextual data.

In an embodiment of the invention, the sensor identification data 42, the event detection data 43, the date 44 and the optional data 45 can be transmitted in encrypted form, which makes it possible to improve the security associated with the communication method according to the invention.

Before transmission of the event signalling message 204 by the sensor 1.i, the message is converted into a succession of ultra wide band pulses by applying a spreading code, in this example a skip code generated pseudo-randomly, for one or more symbols of the message. In fact, in an embodiment, a sequence of skip codes is generated, each of the skip codes providing for the time configuration of a symbol or a set of n symbols in the event signalling message 204, n integer greater than one.

Only the skip code providing for the configuration of the synchronization sequence can be assumed to be fixed in this example of implementation, in order to simplify synchronization between the collector 2 and the sensor 1.i. In order to improve the security of the transmission of the event signalling message 204, the skip code being fixed, the content of the synchronization sequence 41 can be modified at each message and generated pseudo-randomly on the basis of the seed 32. The skip code used for the time configuration of the synchronization sequence can also be generated on the basis of the seed contained in the synchronization message and thus be specific to a cycle.

Thus, a sequence of skip codes can be generated, each skip code being associated with a part of a slot in the period corresponding to the cycle, starting from the second slot, if there is no acknowledgement message, or from the third slot, if there is an acknowledgement message. The part of a slot can correspond to the duration of transmission of at least one symbol in the message to be transmitted. Thus, with the exception of symbols relating to the synchronization preamble, the symbols in the event signalling message 204 are transmitted according to the skip codes which evolve dynamically and which are predefined by means of the pseudo-random generation of the sequence of skip codes on the basis of the seed 32. For each cycle, the collector 2 and the sensor 1.i consequently know which skip code is to be used for transmission of one or more symbols during a given part of one of the time slots in the period corresponding to the cycle. The security associated with the exchanges of messages is thus increased.

For the transmission of the symbols in the synchronization preamble 41, the skip code used is fixed but the content of the synchronization preamble 41 is determined as a function of information, in particular the seed 32, contained in the synchronization message transmitted for the corresponding period.

Thus, as part of the communication method according to the invention, the sensor 1.i will determine the synchronization preamble 41 as well as the skip codes to be applied for the transmission of symbols of the event signalling message 204 for each part of the time slots in the period in question. For its part, the collector 2 appropriately configures a radio interface, as a function of the seed 32, so that there is concordance of configuration between the transmission of event signalling messages 204 and their reception. This concordance is allowed by the pseudo-random generation of the sequence of skip codes on the basis of the seed 32, which is common to the collector 2 and the sensor 1.i.

The collector 2 is configured for the reception of messages over the period dedicated to the transmissions of event signalling messages 204. In fact, using the seed 32 generated randomly, the collector 2 has configured its radio interface so as to be able to receive messages made up of symbols, each symbol being arranged in time as a function of the skip code corresponding to the part of the time slot during which the symbol is transmitted.

The collector, upon reception of the event signalling message 204, can extract the data contained in the event signalling message and transmit it in a transmission message 206 to the processing device 7, which is suitable for processing the data. In an embodiment of the invention, the collector 2 acknowledges receipt of each event signalling message 204 by sending to the sensors an acknowledgement message 208.

The acknowledgement message 208 can have the structure shown in FIG. 3.c. The acknowledgement message 208 can thus comprise a synchronization sequence 51 as well as a plurality of acknowledgement data 52.1-52.k. For example, the number k of acknowledgement data can be defined as a function of a maximum size accepted for the acknowledgement message 208. Each of the acknowledgement data 52.1-52.k relates to an event signalling message 204 sent by one of the sensors 1.1-1.n of the system during a preceding cycle. For this purpose, the acknowledgement data 52.2, selected arbitrarily and by way of example, can comprise identification data for a sensor 53.2, event identification data 54.2 and optional data 55.2. The identification data for a sensor 53.2 refer to the sensor having transmitted the event signalling message acknowledged by the acknowledgement data 52.2. The event identification data 54.2 refer to the event detected by the sensor having transmitted the event signalling message acknowledged by the acknowledgement data 52.2. The optional data 55.2 constitute a space reserved for the addition of supplementary information associated with the detection and can be contextual data.

The acknowledgement message can be transmitted, in an embodiment, during the second slot in a cycle. Thus, it is transmitted with a time arrangement defined by a sequence of skip codes or by a skip code obtained by pseudo-random generation on the basis of a seed generated randomly and transmitted to the sensors 1.1-1.n during the first slot of the corresponding period (in the synchronization message corresponding to the period). Consequently, the sensors 1.1-1.n having transmitted an event signalling message 204 can configure their radio interface so as to be able to receive the acknowledgement message during the second slot of one of the cycles subsequent to the transmission of the event signalling message. In other variants, several acknowledgement messages 208 can be transmitted, over a plurality of slots, which can for example be defined in the synchronization message of the corresponding cycle.

Thus, the sensor 1.i can receive the acknowledgement message 208 during the cycle directly consecutive to the sending of the event signalling message 204. It has previously received the synchronization message 201.3 of the consecutive cycle and is therefore configured to receive the acknowledgement message 208. Upon reception of the acknowledgement message 208, the sensor 1.i verifies that acknowledgement data 52.1-52.k relate to the event signalling message 204 which it has previously transmitted. If acknowledgement data 52.1-52.k correspond, the sensor 1.i can change, in an embodiment, to a deactivated reception mode or standby mode until a next detection of an event for example and will therefore not receive the synchronization message 201.4 of the next cycle.

On the other hand, if none of the data 52.1-52.k corresponds to the event signalling message 204, the sensor 1.i can, in an embodiment of the invention, re-transmit the event signalling message 204 during one of the following time slots by transmitting it in accordance with a time arrangement defined by a sequence of skip codes generated pseudo-randomly on the basis of the seed transmitted during the transmission cycle of the acknowledgement message 208 (and no longer on the basis of the seed used for the initial transmission of the event signalling message 204). In another embodiment, the sensor 1.i can define a number of cycles at the end of which, if no acknowledgement data corresponding to the event signalling message has yet been received, it re-transmits the signalling acknowledgement message, still according to a time arrangement defined by a sequence of skip codes generated randomly on the basis of the seed transmitted for the cycle in progress. The sensor 1.i can also verify that the space dedicated to the acknowledgement data 52.k is used during each of the cycles. In fact, if this space is used, a large number of acknowledgement data must be sent by the collector 2 and the sensor 1.i does not re-transmit an event signalling message until a space is free in the acknowledgement message. This embodiment ensures that the collector 2 is not overloaded, by sending an event signalling message at each cycle.

Figure 4:
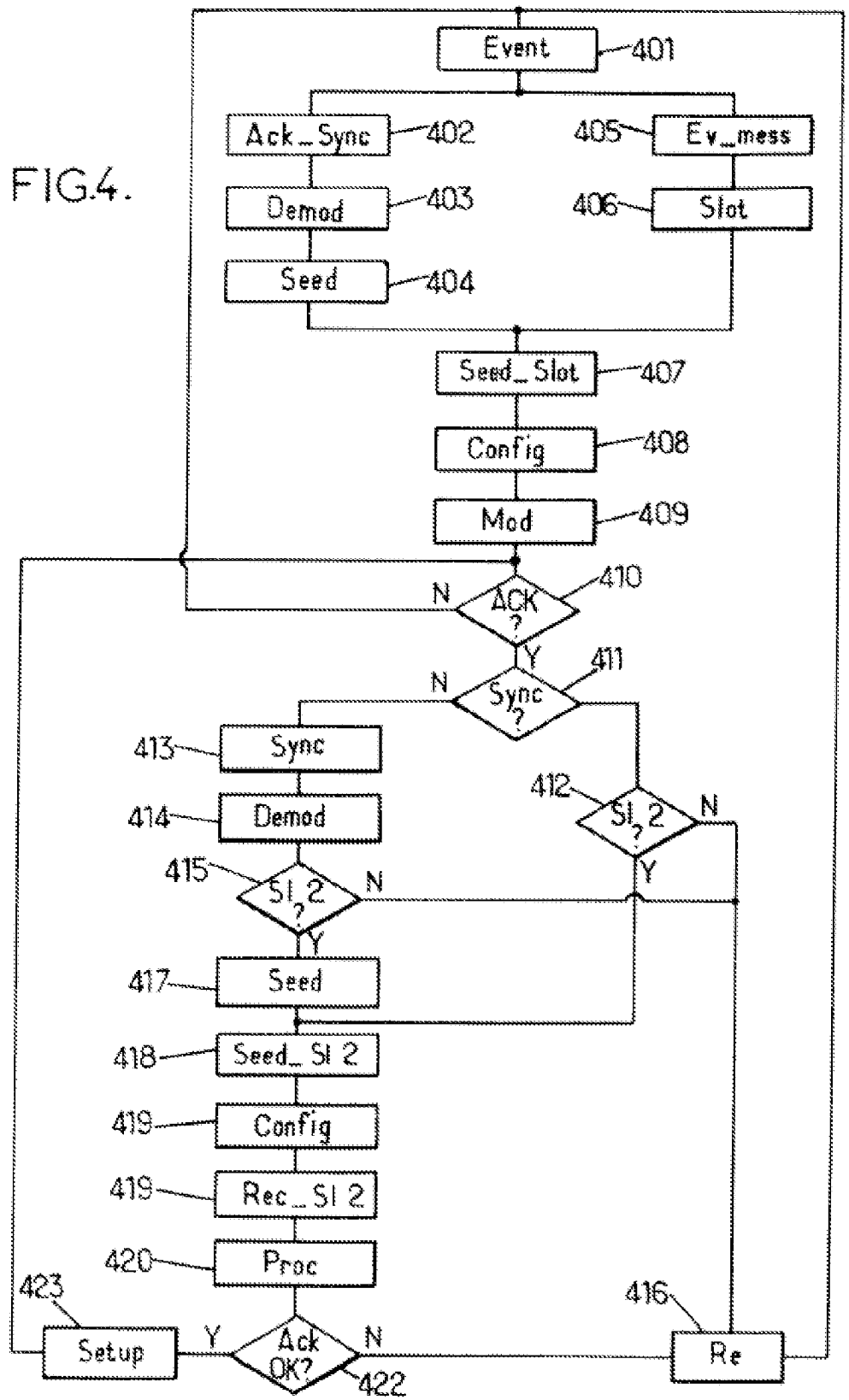
FIG. 4 illustrates a flow chart representing the steps implemented by a sensor for the transmission or re-transmission of an event detection message according to the invention.

FIG. 4 illustrates a flow diagram representing the steps implemented by a sensor for the transmission or re-transmission of an event detection message according to the invention. The sensor 1.i illustrated in FIG. 2 is considered in this example.

The sensor 1.i is suitable for detecting, during a step 401, an event in the surveillance zone 8. In an embodiment, the sensor 1.i is initially in a deactivated reception mode in order to save energy and changes to an active reception mode upon detection of an event.

Upon detection of the event, the sensor 1.i awaits the next synchronization message from the collector 2, which it receives during a step 402 and demodulates the message received during a step 403. The sensor 1.i is capable of demodulating the synchronization message which is transmitted with a time arrangement defined by a skip code known to the sensor 1.i and the collector 2. Thus, upon detection of an event, the sensor 1.i can configure its radio interface to receive messages defined by such a skip code. The synchronization message can have the structure illustrated in FIG. 3.a. When the synchronization message is demodulated, the sensor 1.i can extract, during a step 404, the seed of the synchronization message.

In parallel with steps 402, 403 and 404, the sensor 1.i generates, during a step 405, an event signalling message on the basis of data obtained during the detection of the event. This event signalling message can have the structure described in FIG. 3.b. The sensor 1.i can then randomly select, during a step 406, a time slot in the period corresponding to the transmission cycle of a synchronization message for the transmission of the event signalling message. In an embodiment, the first slot is used for the transmission of a synchronization message by the collector 2 and the second slot is used for the transmission of an acknowledgement message by the collector 2. The slot selected for the transmission of the signalling message by the sensor 1.i can then be selected from the slots starting from the third slot. If the collector 2 does not transmit an acknowledgement message, the slot selected for the transmission of the signalling message by the sensor 1.i can be selected from the slots starting from the second slot. No restriction attaches to the method of selection of the transmission slot. In fact, in another embodiment, the sensor 1.i can cooperate with other sensors in order not to transmit event detection messages during the same slot and thus to avoid a collision at the level of reception of the collector 2.

When the seed is extracted and the slot is selected, the sensor randomly generates the skip codes for the period in progress. The sensor 1.i then identifies, during a step 407, the sequence of skip codes used for the transmission of the event detection message during the slot selected. The sensor 1.i configures, during a step 408, its radio interface for transmission according to the sequence of skip codes corresponding to the slot selected. The event signalling message is modulated and transmitted to the collector 2 during a step 409 according to the sequence of skip codes corresponding to the slot selected. This transmission is performed during the slot selected.

During a step 410, if the sensor 1.i is not awaiting any acknowledgement, it deactivates its reception mode while awaiting the next detection of an event in the surveillance zone 8. For this purpose, the sensor 1.i can consult a table of pending acknowledgements which it stores. If the sensor 1.i is awaiting an acknowledgement, it verifies that it is correctly synchronized with the collector 2, during a step 411, for the reception of an acknowledgement message. The acknowledgement message can have the structure shown in FIG. 3.c. If the sensor 1.i is synchronized, it can thus, during a step 412, consult the acknowledgement data 33 of the synchronization message for the cycle in progress in order to find out whether acknowledgement messages have been transmitted in the second slot of the period corresponding to the cycle or during subsequent slots. If no acknowledgement message is provided for this cycle, the sensor 1.i can provide, during a step 416, for the re-transmission of an event signalling message.

If the sensor 1.i is not synchronized with the collector 2 during the step 411, the sensor 1.i configures its radio interface to receive the next synchronization message from the collector 2. The sensor receives, during a step 413, the synchronization message from the collector 2 and demodulates this message during a step 414. It consults, during a step 415, the acknowledgement data contained in the demodulated synchronization message in order to find out whether an acknowledgement message has been transmitted during the second slot of the period corresponding to the cycle in progress. If no acknowledgement message is provided for this cycle, the sensor 1.i can provide, during a step 416, for the re-transmission of an event signalling message. If the transmission of an acknowledgement message is planned during the second slot, the sensor 1.i extracts, during a step 417, the seed of the synchronization message.

Following the step 417 or following the step 412, if the transmission of an acknowledgement message is planned, the sensor 1.i generates the skip codes, during a step 418, randomly on the basis of the seed received in the synchronization message of the cycle in progress and deduces therefrom the sequence of skip codes to be used for the transmission of the acknowledgement message by the collector 2 during the second slot of the period corresponding to the cycle in progress. The radio interface of the sensor 1.i is configured, during a step 419, for the reception of messages the time arrangement of which is defined by the sequence of skip codes for the second slot of the period corresponding to the cycle in progress. The acknowledgement message of the collector 2 is received by the sensor 1.i during the second slot in a step 420. The acknowledgement message received is demodulated during a step 421 and processed in order to verify, during a step 422, that the acknowledgement data 52.1-52.k contained in the acknowledgement message correspond to the event signalling message sent during the step 409.

If none of the acknowledgement data 52.1-52.k correspond to the event signalling message sent during the step 409, the sensor 1.i can provide, during a step 416, for the re-transmission of an event signalling message.

If the acknowledgement data 52.1-52.k correspond to the event signalling message sent during the step 409, the sensor 1.i updates the table of pending acknowledgements during a step 423. The updated table is subsequently consulted during the step 410 described above.

Figure 5:
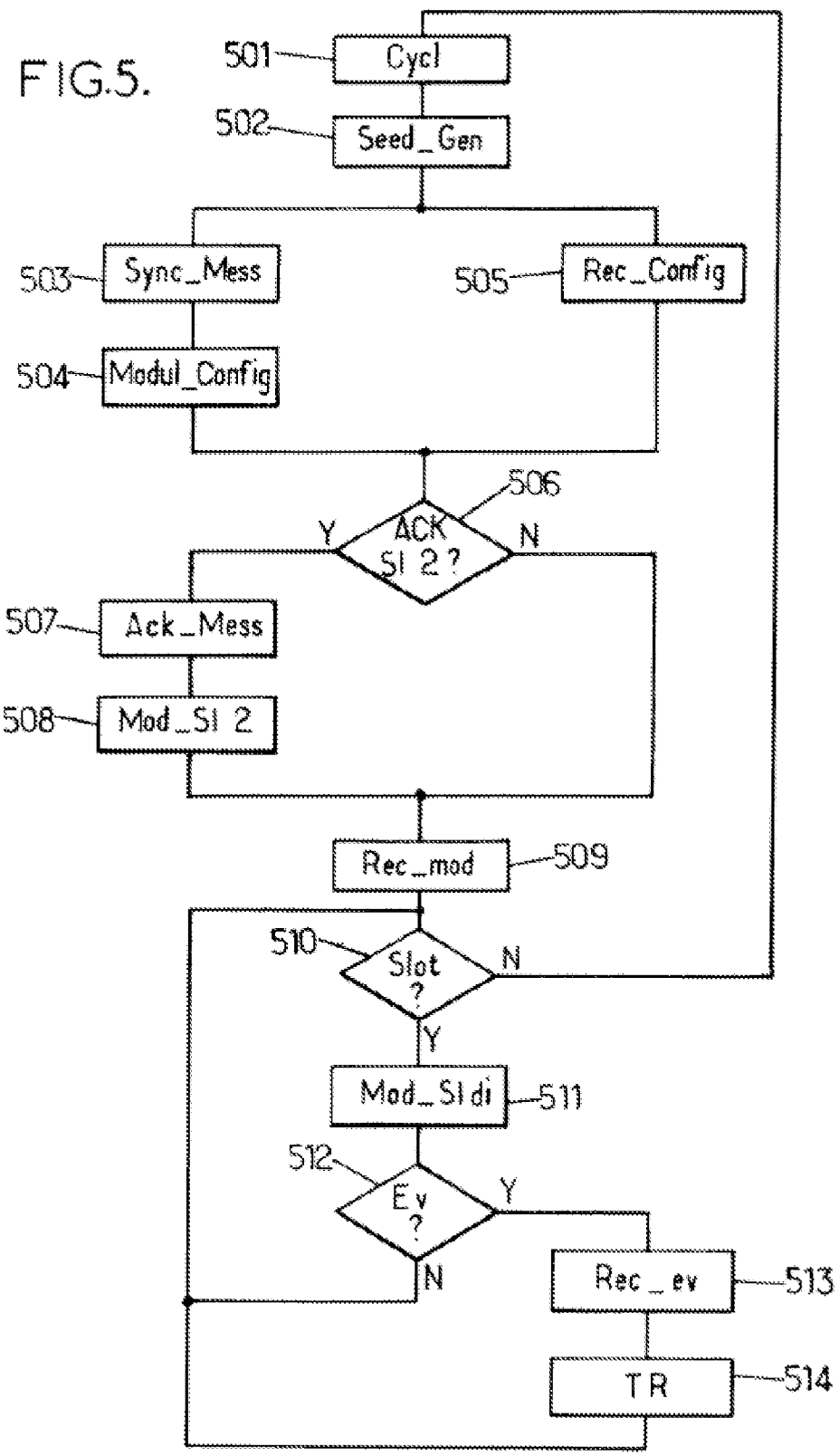
FIG. 5 illustrates a flow chart representing the steps implemented by a collector for the transmission of synchronization and acknowledgement messages according to the invention.

FIG. 5 illustrates a flow diagram representing the steps implemented by a collector for the transmission of synchronization and acknowledgement messages according to the invention. The collector 2 illustrated in FIG. 1 suitable for communicating with a plurality of sensors 1.1-1.n is considered in this example.

During a step 501, the collector 2, connected to a clock for example, awaits the next synchronization message transmission cycle. The collector 2 generates, randomly for example, a seed for the pseudo-random generation of skip codes. The collector thus configures, during a step 505, a reception interface to receive messages the arrangement of which is defined by the skip codes generated pseudo-randomly.

In parallel with step 505, the collector generates, during a step 503, a synchronization message the structure of which can be the one shown in FIG. 3.a. The collector uses for this purpose the seed generated randomly and defines whether acknowledgements are to be transmitted during the second slot of the period corresponding to the synchronization message transmission cycle or during subsequent slots. The synchronization message is then modulated according to a skip code which is fixed and known to the sensors 1.1-1.n. The synchronization message is sent during a step 504 to the network of sensors 1.1-1.n.

The collector 2 then verifies, during a step 506, that acknowledgements are to be sent if event signalling messages have been received during previous cycles.

If no acknowledgement is to be sent, the collector 2 adopts, during a step 509, the reception configuration determined in step 505 for the remaining slots of the period corresponding to the cycle in progress.

If one or more acknowledgements are to be sent, the collector 2 generates an acknowledgement message during a step 507 comprising acknowledgement data 52.1-52.k to acknowledge between 1 and k event signalling messages received previously.

The collector 2 modulates, during a step 508, the acknowledgement message as a function of the sequence of skip codes associated with the second slot of the period corresponding to the cycle in progress and sends the modulated acknowledgement message to the network of sensors 1.1-1.n.

The collector 2 adopts, during a step 509, the reception configuration determined in step 505 for the remaining slots of the period corresponding to the cycle in progress.

The collector 2 verifies, during a step 510, that there are remaining slots dedicated to the reception of event signalling messages from the network of sensors 1.1-1.n.

If the cycle is finished and there is no remaining slot for the reception of event signalling messages, the collector starts a new cycle during the step 501 described above.

If there are remaining slots for the reception of event signalling messages, the collector 2 is configured, during a step 511, for the reception of messages the time arrangement of which is defined by the sequence of skip codes associated with the next slot in the period corresponding to the cycle in progress.

The collector 2 verifies, during a step 512, if an event signalling message is received during the slot in progress.

If no event signalling message is received, the collector 2 again verifies that there are remaining slots dedicated to the reception of event signalling messages from the network of sensors 1.1-1.n during the step 510 described above.

If a signalling message is received, the collector 2 demodulates, during a step 513, the received signalling message and transmits, during a step 514, the demodulated event signalling message to the processing device 7. The collector 2 can also update the table of pending acknowledgements in order subsequently to transmit an acknowledgement for the event signalling message received.

The collector 2 again verifies that there are remaining slots dedicated to the reception of event signalling messages from the network of sensors 1.1-1.n during the step 510 described above.

Figure 6:
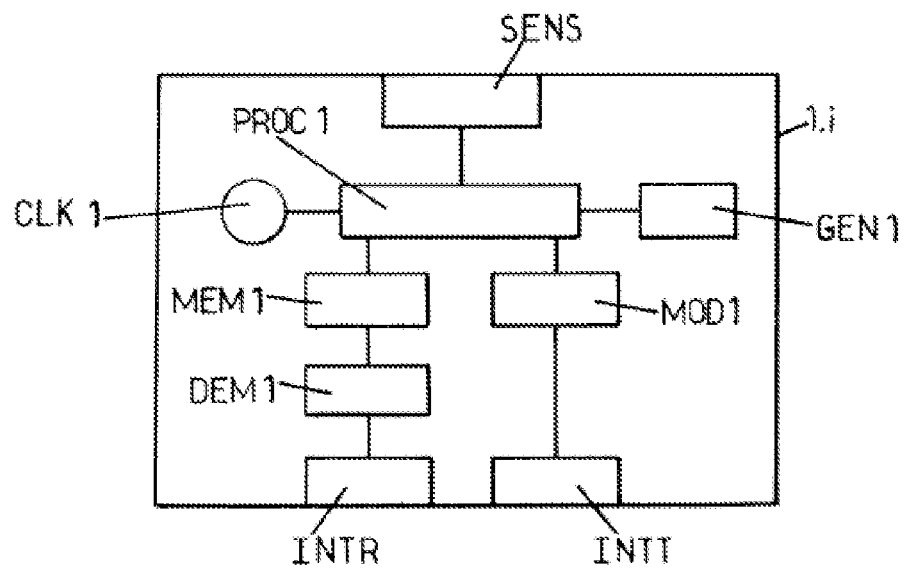
FIG. 6 structurally represents a sensor according to an embodiment of the invention.

FIG. 6 structurally represents the sensor 1.i according to an embodiment of the invention.

The sensor 1.i comprises an event detector SENS suitable for detecting events in the surveillance zone 8. No limitation attaches to the type of detector used. Upon detection of an event, the detector SENS is suitable for transmitting event data to a processor PROC1 of the sensor 1.i. The processor PROC1 is suitable for generating an event signalling message as shown in FIG. 3.b.

The sensor 1.i also comprises a reception interface INTR and a transmission interface INTT suitable for communicating with a collector according to the invention. Thus, upon reception of a synchronization message, as shown in FIG. 3.a, of the collector 2, the time arrangement of which is defined by a fixed skip code, or by a sequence of fixed skip codes, the reception interface INTR is suitable for receiving messages according to such a code and transmits the synchronization message to a demodulator DEL1. The demodulator DEL1 is suitable for demodulating the synchronization message and extracting from it a seed, an acknowledgement option and possible optional data and storing them in a memory MEM1 of the sensor 1.i. The processor PROC1 is connected to the memory MEM1 and suitable for calling up the stored seed in order to transmit it to a pseudo-random number generator GEN1. The generator GEN1 can be suitable for implementing a pseudo-random generation algorithm, such as a PRNG algorithm (for "Pseudo-Random Number Generator") for example. The generator GEN1 is suitable for generating skip codes on the basis of the seed. Each skip code generated is associated with a part of a time slot of a period corresponding to synchronization message transmission cycle. The processor PROC1 is synchronized by means of a clock CLK1 of the sensor 1.i. It can thus attach a date to the event in the event signalling message. The processor PROC1 is also suitable for selecting a time slot for the transmission of the event detection message. During entry into the time slot selected, the processor PROC1 transmits to a modulator MOD1 the event signalling message along with a sequence of skip codes corresponding to the time slot selected. The processor PROC1 also transmits the event signalling message to the memory MEM1 for storage in order subsequently to be compared with an acknowledgement message received.

The modulator MOD1 modulates the event signalling message in an ultra wide band signal by time skip with a time arrangement defined by the sequence of skip codes. The modulator MOD1 transmits the event signalling message thus modulated to the transmission interface INTT for transmission to an event detection data collector. When each event signalling message is sent, the processor PROC1 can update a table of pending acknowledgements stored in the memory MEM1.

The reception interface INTR can also receive an acknowledgement message during the second slot of a cycle or during a subsequent slot. The acknowledgement message can present the structure shown in FIG. 3.c. For this purpose, it is configured for the reception of messages the time arrangement of which is defined by the sequence of skip codes associated with the second time slot of the period corresponding to the cycle in progress. The acknowledgement message is then demodulated by a demodulator DEM1 and stored in the memory MEM1. The processor can compare an event signalling message transmitted previously and stored in the memory MEM1 with acknowledgement data included in the acknowledgement message. If these data correspond, the acknowledgement message and the event signalling message can be deleted from the memory MEM1 and the table of pending acknowledgements can be updated. Otherwise, the processor PROC1 can order the re-transmission of the event signalling message. In an embodiment of the invention, the memory MEM1 and the processor PROC1 can guarantee the confidentiality of the stored data and the skip codes by means of a "tamperproof" technology for example.

In an embodiment, the reception interface INTR and the transmission interface INTT can be mutualized. They can for example be grouped together in the form of a wireless interface 4.i as shown in FIG. 1.

Figure 7:
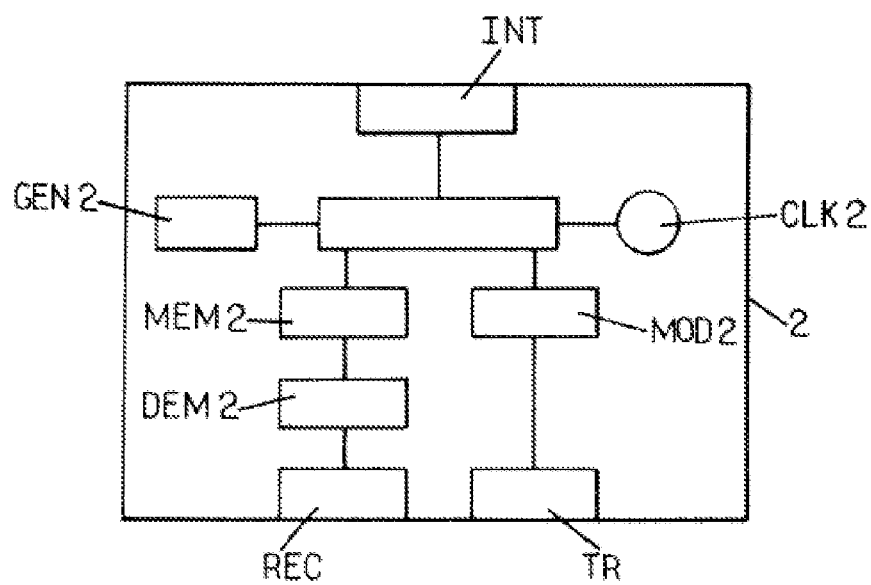
FIG. 7 structurally represents a collector according to an embodiment of the invention.

FIG. 7 structurally represents the collector 2 according to an embodiment of the invention.

The collector 2 comprises a reception interface REC and a transmission interface TR for communicating with a network of event detection sensors. In an embodiment, the reception interface REC and the transmission interface TR can be mutualized. They can for example be grouped together in the form of a wireless interface 3 as shown in FIG. 1. The collector 2 also comprises a processor PROC2 connected to a clock CLK2. The processor PROC2 is suitable for randomly generating a seed and for generating a synchronization message comprising the seed periodically or cyclically. The synchronization message can present the structure illustrated in FIG. 3.a. The clock CLK2 makes it possible to synchronize the processor PROC2 and to divide the period between the transmissions of two synchronization messages into a plurality of time slots, the first slot being reserved for the transmission of the synchronization message to sensors of the network.

The synchronization message is transmitted with a predefined skip code known to the sensors of the network to a modulator MOD2 of the collector 2. The modulator MOD2 is suitable for modulating the synchronization message in ultra wide band signals with a time skip the time arrangement of which is defined by the predefined skip code. The synchronization message thus modulated is transmitted to the transmission interface for a transmission to the network of sensors. The processor PROC2 is connected to a pseudo-random skip code generator GEN2. The generator GEN2 pseudo-randomly generates skip codes on the basis of the seed. The processor PROC2 associates each skip code generated with a part of a time slot of a period corresponding to a synchronization message transmission cycle. The reception interface can thus be configured at each cycle for the reception of messages modulated on the basis of skip codes generated randomly.

The collector 2 can thus receive event signalling messages from the sensors of the network in each time slot of the cycle starting from the second slot. In an embodiment, the collector 2 transmits acknowledgement messages during the second slot of the period. Consequently, the signalling messages are received in each time slot starting from the third time slot.

Upon reception of an event signalling message, the message is transmitted by the reception interface REC to the demodulator DEM2, which demodulates the message received and which can store it in memory MEM2. The event signalling message can also be transmitted for processing to a processing device by means of a communication interface INT of the collector 2.

In an embodiment with acknowledgement messages, an acknowledgement is sent to each sensor having transmitted an event signalling message. These acknowledgement messages can be sent during the second time slot and are thus modulated by the modulator MOD2 in ultra wide band signals with time skip the time arrangement of which is defined by the sequence of time skips associated with the second time slot of the period corresponding to the period in progress.

In an embodiment of the invention, the memory MEM2 and the processor PROC2 can guarantee the confidentiality of the stored data and skip codes by means of a "tamperproof" technology for example.

Of course, the present invention is not limited to the embodiment described above by way of example; it extends to other variants.

The invention claimed is:

1. A method of communicating between at least one event detector sensor and a collector of event detection data transmitted by the sensor in the form of an event signalling message the modulation of which is defined by at least one spreading code, wherein the method comprises the steps implemented by the sensor:

upon detection of an event during a given cycle, generation of event detection data;

reception of a synchronization message transmitted according to a transmission cycle by the collector, said synchronization message comprising a seed for a pseudo-random generation of at least one spreading code, wherein the seed is specific to the transmission cycle;

pseudo-random generation of at least one spreading code on the basis of said seed;

transmission of an event signalling message the modulation of which is defined by said at least one spreading code generated randomly, the event signalling message comprising the event detection data; and processing the synchronization message of the cycle which follows said given cycle.

2. The method according to claim 1, wherein only a part of the seed is specific to each cycle, the other part of the seed being predefined between the sensor and the collector.

3. The method according to claim 1, wherein the spreading code is a skip code and wherein the signalling message is transmitted in the form of an ultra wide band signal by time skip defined by said skip code.

4. The method according to claim 1, wherein a period corresponding to a synchronization message transmission cycle by the collector is divided into a plurality of time slots, wherein the synchronization message from the collector is received during the first time slot of each cycle and wherein the signalling message is transmitted during a subsequent time slot.

5. The method according to claim 4, wherein a plurality of spreading codes is generated, said plurality being divided into sequences of spreading codes, each sequence of spreading codes being associated with a time slot starting from the second time slot and each message transmitted in a time slot is transmitted with a modulation defined by the sequence of spreading codes associated with said time slot.

6. The method according to claim 4, wherein the event signalling message comprises a synchronization preamble for synchronising the sensor and the collector, said synchronization preamble being transmitted with a modulation defined by a single spreading code.

7. A non-transitory computer-readable storage medium, with a program stored thereon, said program comprising instructions for implementing the method according to claim 1, when this program is executed by a processor.

8. A method of communicating between at least one event detector sensor and a collector of event detection data transmitted by the sensor in the form of an event signalling message the modulation of which is defined by at least one spreading code, wherein the method comprises the steps implemented by the collector:

transmission of a synchronization message according to a transmission cycle, said synchronization message comprising a seed for a pseudo-random generation of at least one spreading code;

pseudo-random generation of at least one spreading code on the basis of said seed, wherein the seed is specific to the transmission cycle; and reception of an event signalling message the modulation of which is defined by said at least one spreading code, said event signalling message comprising event detection data of a given cycle; and transmission of a synchronization message of a cycle which follows said given cycle for processing by the sensor.

9. A non-transitory computer-readable storage medium, with a program stored thereon, said program comprising instructions for implementing the method according to claim 8, when this program is executed by a processor.

10. A communication system comprising at least one event detector sensor and a collector of event detection data transmitted by the sensor in the form of an event signalling message the modulation of which is defined by at least one spreading code, wherein said collector comprises means for:

transmitting a synchronization message according to a transmission cycle, said synchronization message comprising a seed for pseudo-random generation of at least one spreading code, wherein the seed is specific to the transmission cycle;

receiving an event signalling message comprising event detection data of a given cycle from said sensor;

and in that said sensor comprises means for:

detecting an event during said given transmission cycle;

upon detecting the event, generating the event detection data;

receiving the synchronization message from the collector;

pseudo-randomly generating at least one spreading code on the basis of said seed;

transmitting the event signalling message the modulation of which is defined by said at least one spreading code; and processing the synchronization message of the cycle which follows said given cycle.

11. The system according to claim 10 also comprising a scrambler suitable for transmitting signals the modulation of which is defined by a random spreading code.

12. A collector of event detection data, wherein the collector is configured to:

transmit a synchronization message according to a transmission cycle, said synchronization message comprising a seed for pseudo-random generation of at least one spreading code, wherein the seed is specific to the transmission cycle;

pseudo-randomly generate at least one spreading code on the basis of said seed;

receive an event signalling message the modulation of which is defined by said at least one spreading code, the signalling message comprising event detection data of a given cycle; and transmit a synchronization message of a cycle which follows said given cycle for processing by a sensor.

13. An event detector sensor configured to:

detect an event during a given cycle;

generate event detection data upon detection of the event during the given cycle;

receive a synchronization message according to a transmission cycle, said synchronization message comprising a seed for pseudo-random generation of at least one spreading code, wherein the seed is specific to the transmission cycle;

pseudo-randomly generate at least one spreading code on the basis of said seed;

transmit an event signalling message the modulation of which is defined by said at least one spreading code, the signalling message comprising the event detection data; and process the synchronization message of the cycle which follows said given cycle.

* * * * *